United States Patent Office 3,488,270
Patented Jan. 6, 1970

3,488,270
FREE RADICAL PROCESS FOR THE PREPARATION OF H₂S-ALLENE ADDUCTS
Karl Griesbaum, Elizabeth, and Alexis A. Oswald, Mountainside, N.J., assignors to Esso Research and Engineering Company, a corporation of Delaware
No Drawing. Filed May 18, 1964, Ser. No. 368,317
Int. Cl. C07c 3/24; B01j 1/10
U.S. Cl. 204—162
15 Claims

ABSTRACT OF THE DISCLOSURE

A free radical process reacting allene with hydrogen sulfide results in the selective formation of allyl mercaptan as the primary product of mono addition, whereas secondary reactions results mostly in difunctional products of unbranched structure, i.e., trimethylenedithiol or diallyl sulfide, depending on reactant ratios; the products being useful as chemical intermediates in the preparation of polymers and agricultural chemicals.

---

This invention relates to a novel method of preparing difunctional sulfur-containing compounds by the addition of hydrogen sulfide to allene.

Allyl mercaptan, trimethylenedithiol and diallylsulfide are known prior art difunctional compounds. It has now been found that these compounds possess potential utility as chemical intermediates in the preparation of a wide variety of useful compounds such as polymers and agricultural chemicals. The utilization of these compounds has been limited by the fact that known methods for preparing these materials involved expensive and indirect methods which resulted in low yields of the desired products. For example, allyl mercaptans have been conventionally prepared by a reaction between an allyl halide and a sulfur-containing salt such as sodium hydrogen sulfide. This reaction results in a low yield of the desired allyl mercaptan and, in addition, is expensive due to the formation of unrecoverable halide salts during the reaction period.

It is an object of this invention to provide a simple and direct process for the preparation of the above-mentioned compounds in good yields.

It has now been discovered that hydrogen sulfide may be directly reacted with allene in a free radical type reaction to form a wide variety of organic sulfur-containing compounds. Furthermore, it has been found that by employing certain critical reaction conditions, the selectivity of the reaction for the production of either allyl mercaptans, trimethylenedithiol or diallylsulfide can be promoted.

The addition of hydrogen sulfide to allene in a free radical type reaction has been found to take place predominantly via an attack of the terminal carbon atom of allene by a sulfhydryl radical. Thus, the reactions and products resulting from the free radical addition of hydrogen sulfide to allene may be schematically represented as follows:

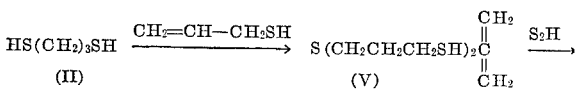

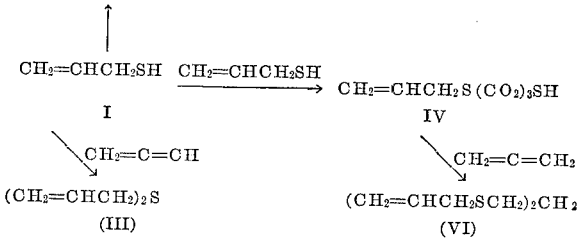

As can be seen from the above equation, the reaction is capable of producing a wide variety of products. Initially, the hydrogen sulfide adds to a terminal carbon atom of allene to produce allyl mercaptan (I). The allyl mercaptan product is a highly reactive material which may readily react with additional hydrogen sulfide to yield trimethylenedithiol (II). This latter product is capable of undergoing dehydrogenation under the normal conditions of reaction to form a disulfide in minor amounts or may add to a mole of the reactive allyl mercaptan to form bis 3-mercapto-propyl) sulfide (V). Alternatively, the allyl mercaptan obtained from the original addition of hydrogen sulfide to allene may undergo reaction with an additional mole of allene to produce diallyl sulfide (III). A third possible reaction is that involving a dimerization of the initially-formed allyl mercaptan to form allyl (3-mercapto propyl) sulfide (IV). Various other by-products such as high-boiling telomers formed by the addition of several moles of allene to the intermediate 3-mercapto-2-propenyl radical (not shown) may be formed in the reaction under certain conditions.

The above-described free radical reaction is normally carried out in the presence of a catalyst. The catalysts employable in the reaction are free-radical type initiators and include ultra-violet light, gamma radiation and a wide variety of peroxidic and azo compounds. Typical free radical initiators are cumene hydroperoxide, tertiary butyl hydroperoxide, bis-azoisobutyronitrile and bis-azo-1-butyronitrile. In some instances, it may be preferable to employ combinations of the above-named peroxidic or azo compounds with each other or with ultra-violet light, for the purpose of increasing the reaction rate.

The molar ratio of the hydrogen sulfide and allene reactants is a critical feature of this invention since the various products outlined above may be formed in widely varying proportions dependent upon the relative amounts of the starting materials. The presence of an excess of hydrogen sulfide has been found to favor the formation of trimethylenedithiol. It has been discovered that when hydrogen sulfide and allene are reacted in equimolar proportions, a wide distribution of the products identified as I, II, III, IV and V are produced by the free radical reaction. The use of excess amounts of hydrogen sulfide in the range of 3/2 to 20 and preferably 2 to 15 moles of H₂S per mole of allene results in the increased formation of the desired trimethylenedithiol product at the expense of the other by-products which are capable of being formed in the reaction. Thus, when equimolar amounts of allene and hydrogen sulfide are reacted, the yield of allene adducts may contain less than 50% of the dithiol adduct as compared to more than 70% of the dithiol adduct when an excess of the hydrogen sulfide reactant is employed.

The reaction may also be carried out employing an excess of the allene reactant. When 3/2 to 20 moles and preferably 2 to 10 moles of allene per mole of hydrogen sulfide are employed in the reaction, the formation of the products I, III, IV and VI, described above, are formed at the expense of compounds II and V. Thus, the use of an excess of allene results in the formation of substantial amounts of diallyl sulfide as compared to the minor amounts of this compound which are formed when equimolar amounts of the starting material or excess amounts of hydrogen sulfide are employed.

The reaction conditions are another critical feature of this invention. While the reaction is capable of being carried out in both the liquid and gas phases, under a wide variety of temperatures and pressures, the utilization of certain reaction conditions has an important effect on the selectivity of the reaction for producing selected products. Thus, in one embodiment, this invention contemplates a free radical reaction between allene and hydrogen sulfide in the liquid phase. The liquid phase reaction employing an excess of the hydrogen sulfide reactant will result in the promotion of the formation of the trimethylenedithiol adduct for reasons previously described in this specification. When the liquid phase reaction is carried out at atmospheric pressure, the temperatures of reaction will range from −61° C. to −100° C., preferably −65° C. to −80° C. This temperature range is dictated by the boiling point of the reactants at atmospheric pressure. It will be apparent to those skilled in the art, however, that the application of pressure to the reaction system will increase the boiling points of the respective reactants, and therefore, make possible liquid phase reaction at substantially higher temperatures than those described above. For example, pressures of 75 to 3000 p.s.i.g. and preferably 300 to 2200 p.s.i.g. would make possible the use of temperatures in the range of −70 to +95° C. and preferably +20 to +80° C., while still maintaining a liquid phase reaction system. The liquid phase reaction will, of course, be initiated by the presence of 0.5 to 10 wt. percent preferably 1 to 5 wt. percent, based on allene, of a free radical initiator as described above or will be irradiated by ultraviolet light. In addition, it has been discovered that the rate of reaction may be enhanced by agitation of the reaction system.

It is a further discovery of this invention that the reaction may be carried out in the gas phase as well as the liquid phase and reaction in the former manner may be employed to promote the selective formation of allyl mercaptan. Thus, for example, allene and hydrogen sulfide may be reacted at atmospheric pressure and temperatures in the range of −25° C. to +70° C., preferably 0° C. to 50° C. to form a liquid allyl mercaptan product. While high yields of allyl mercaptan may not be recovered from the liquid phase reaction, due to its reactive nature as previously described in this specification, the gas-phase reaction provides a method for selectively producing allyl mercaptan in high yields since the liquid allyl mercaptan product may easily be separated from the gaseous starting reactants as this product is formed in the free radical reaction. It will occur to those skilled in the art that the gas-phase reaction is also amenable to superatmospheric pressures and higher temperatures while still maintaining the starting reactants in the gas-phase and producing the easily recoverable liquid allyl mercaptan product. Pressures in the range of 10 to 2400 p.s.i.g., preferably 200 to 2000 p.s.i.g. and temperatures in the range of 20 to 200° C., preferably 50 to 150° C. are suitable for this purpose. Furthermore, the gas-phase reaction may be run under higher temperatures so as to produce a gaseous allyl mercaptan product which will then be selectively converted in high yields to either the trimethylenedithiol compound or diallyl sulfide compound, depending upon the molar ratio of the starting materials. Thus, when atmospheric pressure is employed in the gas-phase reaction, temperatures above 68° C., the boiling point of allyl mercaptan, will result in the selective production of the diadducts. Similarly, when superatmospheric pressures are employed, reaction temperatures above the boiling point of allyl mercaptan will result in the diadducts as described above.

The invention will be further understood by reference to the following illustrative examples.

EXAMPLE 1

3.4 grams of hydrogen sulfide was added to 2 grams of allene in an equimolar, liquid phase reaction. Allene of 99.5+% purity and C.P. grade hydrogen sulfide were employed. The reactants were condensed into a 200 ml. cylindrical quartz tube equipped with an effective, airtight mechanical stirrer. The tube was placed in a Freon bath which was maintained between −70 and −80° C. by means of a low temperature circulating unit. A 100 watt Hanau ultraviolet immersion lamp was placed about 5 cm. from the reaction tube. The lamp was surrounded by a quartz mantle in order to insulate it against excessive cooling. After 67 hours of continuous irradiation and stirring, the reaction was stopped. The unreacted hydrogen sulfide and allene were carefully removed by allowing the mixture to gradually warm up to room temperature. The evaporating gases were passed through a trap at −20° C. to withhold volatile products other than $H_2S$ or allene. The outlet of this trap was connected to a drying tower to prevent moisture from entering into the cold adduct mixture. The pale yellow liquid which remained in the reaction tube after all excess reactants were removed was analyzed by gas/liquid chromatography, nuclear magnetic resonance and infrared spectroscopy. The results are shown in Table I.

EXAMPLE 2

A liquid phase addition reaction similar to Example 1 was carried out for 6.5 days employing 16 grams of allene and 212 grams of hydrogen sulfide. The molar ratio of the reactants was 15 moles of $H_2S$ per moles of allene. 0.9 grams (5.6 wt. percent based on allene) of tertiary butyl hydroperoxide was employed in addition to the ultraviolet irradiation. The allene employed contained 2 to 5 wt. percent of 2-chloropropene as an impurity. Conversion and yields of the various products were based on pure allene and are tabulated in Table I. 11.6% of 2-chloropropanethiol and 0.6% of a higher boiling component were detected by gas/liquid chromatography in addition to the components listed in Table I.

EXAMPLE 3

A liquid phase addition reaction similar to Example 1 was carried out for 5 hours employing 16 grams of allene and 136 grams of hydrogen sulfide. The molar ratio of the reactants was 10 moles $H_2S$/allene. The allene employed contained 2 to 5 wt. percent of 2-chloropropene as an impurity. Conversion and yields of the various products were based on pure allene and are shown in Table I. 13.7% of 2-chloropropanethiol and 1.4% of a higher boiling component were detected by gas/liquid chromatography in addition to the components listed in Table I.

EXAMPLE 4

A liquid phase addition reaction similar to Example 1 was carried out for 5 hours employing 16 grams of allene and 136 grams of hydrogen sulfide. The molar ratio of the reactants was 10 moles of $H_2S$ per moles of allene. 0.5 grams (3 wt. percent based on allene) of bisazo isobutyronitrile was employed in addition to the ultraviolet irradiation. The allene employed contained 2 to 5 wt. percent of 2-chloropropene as an impurity. Conversion and yields of the various products were based on pure allene and are tabulated in Table I. 6.2% of 2-chloropropanethiol and 3% of a higher boiling component were detected comprising a total of 2 wt. percent by gas/liquid chromatography in addition to the components listed in Table I.

EXAMPLE 5

A liquid phase addition reaction similar to Example 1 was carried out for 5 days employing 16 grams of allene and 136 grams of hydrogen sulfide. The molar ratio of the reactants was 10 moles of H₂S per moles of allene. 0.9 (5.6 wt. percent based on allene) of tertiary butyl hydroperoxide was employed in addition to the ultraviolet irradiation. The allene employed contained 2 to 5 wt. percent of 2-chloropropene as an impurity. Conversion and yields of the various products were based on pure allene and are tabulated in Table I. 10.6% of 2-chloropropanethiol and 3% of a high boiling component were detected comprising a total of 3.5 wt. percent by gas/liquid chromatography in addition to the components listed in Table I.

EXAMPLE 6

A liquid phase addition reaction similar to Example 1 was carried out for 24 hours employing 11.2 grams of allene and 128 grams of hydrogen sulfide. The reactants were in a molar ratio of 13/1 with the hydrogen sulfide in excess. Conversion and yield of the various products are shown in Table I.

TABLE I

| | | | | Relative Amounts of Liquid Components in the Adduct Mixtures, Mol Percent | | | | | |
|---|---|---|---|---|---|---|---|---|---|
| Example: | H₂S: Allene (mole) | Catalyst used | Reaction time | Conv., percent | CH₂=CHCH₂SH | HS(CH₂)₃SH | (CH₂=CHCH₂)₂S | CH₂=CHCH₂S(CH₂)₃SH | HS(CH₂)₃S(CH₂)₃SH HSCH₂CHSHCH₃ |
| 2 | 15 | U.V./t-BuOOH | 6.5 days | 67 | 17.3 | 75.2 | | 5.4 | 0.8 |
| 6 | 13 | Ultra-violet | 24 hrs | 32 | 21.8 | 72.5 | 0.2 | 4.0 | 1.2 |
| 5 | 10 | U.V.-BuOOH | 5 days | 57 | 20.6 | 69.0 | | 6.9 | 0.9 |
| 4 | 10 | U.V./AIBN | 5 hrs | 32 | 45.6 | 47.7 | | 2.0 | 2.0 0.2 |
| 3 | 10 | Ultra-violet | do | 21 | 44.0 | 50.4 | | 2.6 | 1.7 2.6 0.4 |
| 1 | 1 | do | 67 hrs | 26 | 11.2 | 54.8 | 0.2 | 11.6 | 11.8 |
| 7 | 0.2 | do | 44 hrs | 1 43 | 41 | | 22 | 4 | 10 9.1 |

¹ The remainder of the adduct mixture consisted of 4% of (CH₂=CHCH₂SCH₂)₂CH₂ and higher boiling oligomeric products.

The summary of results in Table I clearly indicates that the liquid phase reaction with an excess of hydrogen sulfide favors the formation of 1,3-propanedithiol. The 5-hour runs with a 10/1 excess of hydrogen sulfide (Examples 3 and 4) produced an amount of dithiol which is almost equal to that produced in a 67 hour run with equimolar amounts of reactants and significantly lesser quantities of other by-products were synthesized. Furthermore, the data for Examples 3 and 4 indicates the presence of substantial quantities of allyl mercaptan which would be converted to the dithiol if the reaction had been permitted to continue. Similarly, Example 6 indicates the higher selectivity for production of the dithiol as the molar excess of H₂S is increased.

EXAMPLE 7

A liquid phase addition reaction similar to Example 1 was carried out for 44 hours employing a 5 molar excess of allene. 3.4 grams of H₂S and 20 grams of allene were used in the reaction. The conversion and yields of the various products are shown in Table I. The example shows that the use of an excess of allene promotes the formation of diallyl sulfide as can be seen by a comparison to Examples 1–6.

EXAMPLE 8

A 2-liter, single neck, round bottom quartz flask was inverted and its neck was tightly connected to the top of a 10 ml. graduated cylinder which contained a side outlet. The apparatus was evacuated and the graduated cylinder was maintained at the temperature of liquid nitrogen. 2 grams (0.05 mole) of allene and 3.4 grams (0.1 mole) of H₂S were condensed into the graduated cylinder. The apparatus was then closed, the cooling bath for the cylinder was removed and the reactants were allowed to completely evaporate into the evacuated 2-liter flask at room temperature.

The flask was then irradiated with ultraviolet light. After 3 to 5 minutes the reaction mixture became hazy and a precipitate began to form on the inside walls of the flask. The reaction was continued for 7 hours during which the precipitate was collected in the graduated cylinder. The cylinder was cooled to −78° C. and the reaction flask was gently warmed to promote condensation of the adduct into the graduated cylinder.

Analysis of the liquid product in the cylinder indicated that it consisted of 85 mole percent of allyl mercaptan and 15 mole percent of diallyl sulfide. Small amounts of a second condensate were collected, analyzed and found to contain 16 mole percent allyl mercaptan, 41% diallyl sulfide, 15% trimethylenedithiol and three other components whose structures are unknown.

The results of this example indicate that the free radical reaction is capable of being carried out in the gas phase and furthermore that this technique is capable of selectively promoting the formation of allyl mercaptan.

It is to be understood that the invention is not limited to the specific examples which have been offered merely as illustration and that modifications may be made without departing from the spirit of the invention.

What is claimed is:

1. A process for preparing trimethylenedithiol which comprises reacting hydrogen sulfide and allene in the liquid phase at a temperature in the range of −80° to +95° C. and a pressure in the range of 0 to 3000 p.s.i.g., in the presence of a free radical catalyst, the hydrogen sulfide to allene molar ratio being in the range of 1:1 to 15:1.

2. The process of claim 1 wherein the temperature is in the range of −70 to −80° C. and the pressure is 0 p.s.i.g.

3. The process of claim 2 wherein the free radical catalyst is ultraviolet light.

4. A process for preparing diallyl sulfide which comprises reacting hydrogen sulfide and allene in the liquid phase at a temperature in the range of −80° to +95° C.

and a pressure in the range of 0 to 3000 p.s.i.g. in the presence of a free radical catalyst, the molar ratio of allene to hydrogen sulfide being in the range of 2/1 to 10/1.

5. The process of claim 4 wherein the temperature is in the range of −70° to −80° C. and the pressure is 0 p.s.i.g.

6. The process of claim 5 wherein the free radical catalyst is ultraviolet light.

7. A process for preparing a difunctional organic sulfur compound selected from the group consisting of trimethylene dithiol, diallyl sulfide, allyl mercaptan and mixtures thereof which comprises reacting hydrogen sulfide with allene at a temperature of about −80° C. to +200° C. in the presence of a free radical catalyst.

8. The process of claim 7 wherein the reaction is carried out at a hydrogen sulfide to allene mole ratio of 15:1 to 1:10.

9. The process of claim 7 wherein the ratio of hydrogen sulfide to allene is at least 1:1.

10. The process of claim 9 wherein the molar ratio of hydrogen sulfide to allene is about 2:1 to 15:1.

11. The process of claim 9 wherein the molar ratio of hydrogen sulfide to allene is about 10:1 to 15:1.

12. A process for preparing allyl mercaptan which comprises reacting hydrogen sulfide and allene in the gas phase at a pressure of about 0 to 2400 p.s.i.g. in the presence of ultraviolet light at a temperature below the boiling point of allyl mercaptan and recovering the liquid product.

13. The process of claim 12 wherein the pressure is 0 p.s.i.g. and the temperature is in the range of about −25° to about +68° C.

14. A process for preparing an organic sulfur compound selected from the group consisting of trimethylene dithiol and diallyl sulfide which comprises reacting hydrogen sulfide and allene in the gas phase at a pressure of about 0 to 2400 p.s.i.g. in the presence of ultraviolet light at a temperature above the boiling point of allyl mercaptan.

15. The process of claim 14 wherein the pressure is atmospheric and the temperature is above 68° C.

References Cited

Van der Ploeg et al.: Recueil des travaux chimiques des Pays-bas, vol. 81 (September-October 1962), pages 775–782.

HOWARD S. WILLIAMS, Primary Examiner

U.S. Cl. X.R.

260—609